US011491597B2

(12) United States Patent
Wierzchon

(10) Patent No.: US 11,491,597 B2
(45) Date of Patent: Nov. 8, 2022

(54) DUST EXTRACTION DEVICE

(71) Applicant: Robert Bosch GmbH, Stuttgart (DE)

(72) Inventor: Peter Wierzchon, Morton Grove, IL (US)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 16/583,423

(22) Filed: Sep. 26, 2019

(65) Prior Publication Data

US 2020/0101573 A1 Apr. 2, 2020

(30) Foreign Application Priority Data

Sep. 28, 2018 (DE) ..................... 10 2018 216 726.5

(51) Int. Cl.
*B23Q 11/00* (2006.01)
*B23B 51/00* (2006.01)

(52) U.S. Cl.
CPC ...... *B23Q 11/0046* (2013.01); *B23B 51/0054* (2013.01); *B23Q 11/0071* (2013.01); *B23Q 2220/008* (2013.01)

(58) Field of Classification Search
CPC ............ B23Q 11/0046; B23Q 11/0071; B23Q 2220/008; B23B 51/0054
See application file for complete search history.

(56) References Cited

U.S. PATENT DOCUMENTS

| 2,994,235 A | 8/1961 | Rise | |
|---|---|---|---|
| 3,397,600 A * | 8/1968 | Wells | B23B 51/0054 408/112 |
| 5,129,467 A * | 7/1992 | Watanabe | B23Q 11/0046 173/217 |
| 5,904,453 A | 5/1999 | Gavia | |
| 7,455,486 B2 * | 11/2008 | Britz | A47L 9/102 175/213 |
| D677,545 S * | 3/2013 | Sell | D8/70 |
| 8,636,084 B2 * | 1/2014 | Ohlendorf | B23Q 11/0046 173/198 |
| 9,056,379 B2 * | 6/2015 | Yoshikane | B23Q 11/0046 |
| 9,440,344 B2 * | 9/2016 | Ikuta | B23Q 11/0046 |
| 9,776,296 B2 * | 10/2017 | Brewster | B25F 5/02 |
| 10,328,541 B2 * | 6/2019 | Wong | B25F 5/026 |
| 10,493,577 B2 * | 12/2019 | Furusawa | B23B 47/34 |
| 10,512,997 B2 * | 12/2019 | Yoshikane | B23B 47/34 |
| 10,688,613 B2 * | 6/2020 | Machida | B23Q 11/0071 |
| 10,857,643 B2 * | 12/2020 | Cacchiotti | B25D 17/20 |
| 10,864,609 B2 * | 12/2020 | Mori | B23Q 11/0071 |

(Continued)

FOREIGN PATENT DOCUMENTS

| EP | 2 639 010 A1 | 9/2013 |
|---|---|---|
| GB | 1 569 532 A | 6/1980 |

*Primary Examiner* — Joshua G Kotis
*Assistant Examiner* — Scott A Howell
(74) *Attorney, Agent, or Firm* — Maginot, Moore & Beck LLP

(57) ABSTRACT

A fastening device for a dust extraction device is configured to detachably connect the dust extraction device to a handheld power tool. The fastening device includes a first connection unit and a second connection unit. The first connection unit is configured to connect the dust extraction device to the hand-held power tool by form closure. The second connection unit is configured to connect the dust extraction device to the hand-held power tool by force closure.

14 Claims, 6 Drawing Sheets

(56) References Cited

U.S. PATENT DOCUMENTS

| | | | | |
|---|---|---|---|---|
| 11,020,846 B2* | 6/2021 | Kawano | .................... | B25F 5/00 |
| 2004/0251041 A1* | 12/2004 | Grossman | .......... | B23Q 11/0046 |
| | | | | 173/217 |
| 2005/0089380 A1* | 4/2005 | Stoerig | .............. | B23Q 11/0046 |
| | | | | 408/67 |
| 2011/0008118 A1* | 1/2011 | Yoshikane | ......... | B23Q 11/0046 |
| | | | | 408/67 |
| 2011/0308830 A1* | 12/2011 | Furusawa | ............... | B25F 5/003 |
| | | | | 173/198 |
| 2013/0213683 A1* | 8/2013 | Brewster | ............ | B23Q 11/0046 |
| | | | | 173/198 |
| 2017/0232565 A1* | 8/2017 | Machida | ................. | B25F 5/008 |
| | | | | 173/198 |
| 2017/0348812 A1* | 12/2017 | Brewster | ................ | B23Q 11/00 |
| 2020/0101573 A1* | 4/2020 | Wierzchon | ......... | B23Q 11/0046 |

* cited by examiner

DUST EXTRACTION DEVICE

This application claims priority under 35 U.S.C. § 119 to patent application no. DE 10 2018 216 726.5, filed on Sep. 28, 2018 in Germany, the disclosure of which is incorporated herein by reference in its entirety.

BACKGROUND

Described in EP 2 639 010 A1 is an ancillary handle for a hand-held power tool, which is connected to the hand-held power tool via a first clamp and to a dust extraction system via a second clamp.

SUMMARY

The disclosure relates to a fastening device for a dust extraction device, which is designed to detachably connect the dust extraction device to a hand-held power tool, in particular a hammer drill, having a first connection unit for connecting the dust extraction device to the hand-held power tool by form closure. It is proposed that the fastening device have a second connection unit for connecting the dust extraction device to the hand-held power tool by force closure. It is thereby possible, advantageously, to realize secure and substantially zero-play mounting of the dust extraction device on the hand-held power tool.

The dust extraction device is preferably realized as an accessory for the hand-held power tool, the hand-held power tool also being able to be used without the accessory. The dust extraction device is designed, in particular, to extract dust material by suction, for example drilling dust/grinding dust/sawdust, as work is being performed on a workpiece by the hand-held power tool. In particular, the dust extraction device has an air channel, through which an airflow is routed during operation. The airflow may be generated, in particular, by means of a fan unit. The fan unit may be arranged in the dust extraction device, in the hand-held power tool or in an external dust extractor. The fan unit comprises at least one ventilator element, which is realized, for example, as a radial ventilator or as an axial ventilator. The hand-held power tool may be realized, for example, as a hammer drill, power drill, chipping hammer, percussive power drill, angle grinder, power sander, saber saw, etc, these power tools having in common that drilling dust/grinding dust/sawdust is produced during operation. The hand-held power tool may be realized as a mains-power operated appliance or as a battery-operated appliance.

The first connection unit and the second connection unit are assigned to a mechanical interface of the dust extraction device, which is designed, in particular, for detachably connecting the dust extraction device to the hand-held power tool, in particular connecting a housing of the dust extraction device to a housing of the hand-held power tool, by force closure and form closure. In the context of this application, a "detachable connection" is to be understood to mean, in particular, a connection that can be detached without use of any tools. In the context of this application, a form closure is to be understood to mean an inhibited movement of a component along a form-closure axis, the movement being impeded by a further component, for example by stopping. In particular, the components bear against each other along the form-closure axis, or bear against each other with play. The form closure in this case acts, in particular, in both mutually opposite directions on the form-closure axis. Preferably, the form closure acts along two mutually perpendicular form-closure axes. In the context of this application, a force closure is to be understood to mean, in particular, an impeded movement of a component along a force-closure axis. In this case, the movement of the component is not impeded by a further component. The impeding is effected, in particular, by means of a frictional contact. The first connection unit may additionally be designed to connect the dust extraction device to the hand-held power tool by force closure. The second connection unit may additionally be designed to connect the dust extraction device to the hand-held power tool by form closure.

In addition, it is likewise conceivable for the dust extraction device to have an electrical interface, via which, for example, the dust extraction device can be supplied with energy, exchange information or be controlled. The electrical interface may be realized, for example, as a universal interface, in particular as a USB interface. The electrical interface may have electrical contact elements, which make an electrical connection via a physical contact with corresponding electrical contact elements that are arranged, for example, on a battery pack, on a load or on a charging device. In particular, the electrical interface is realized, at least partly, as a battery interface for detachably connecting the dust extraction device to a battery pack, in particular to a battery pack of a hand-held power tool. The battery pack has a housing, in which at least one battery cell, for example a Li-ion round cell, is accommodated. The battery pack is preferably detachably connected to the dust extraction device. The battery pack is preferably realized as a slide-on battery pack that, for the purpose of connection, is slid linearly onto the dust extraction device via guide rails. The battery pack is realized, in particular, as an 18 V battery pack having, for example, 5 or 10 battery cells.

Preferably, the dust extraction device has a dust collection chamber. The dust collection chamber is designed, in particular, to receive the dust material produced during operation of the hand-held power tool. The dust collection chamber is arranged, in particular, in such a manner that the airflow is at least partly routed through the dust collection chamber. In particular, the dust collection chamber has a dust collection chamber housing. The dust collection chamber housing may be integrated into the housing of the dust extraction device, or alternatively may be realized such that it can be detachably connected to it. The dust collection chamber has an inlet, via which the airflow enters the dust collection chamber, and an outlet, via which the airflow exits the dust collection chamber. The inlet and the outlet of the dust collection chamber are preferably realized separately from each other. Furthermore, it is conceivable for the dust collection chamber to have an emptying opening, which is designed for emptying the dust collection chamber. Preferably, the emptying opening can be closed, for example by means of an emptying flap. The dust extraction device, in particular the dust collection chamber of the dust extraction device, has in particular a filter unit for filtering the dust material out of the airflow. The filter unit is arranged, in particular, in the region of the outlet of the dust collection chamber. The filter unit can be connected, in particular detachably, to the dust extraction device, preferably can be detachably connected to the dust collection chamber of the dust extraction device. The filter unit has at least one filter element. The filter element may be composed, for example, of a felt, a non-woven fabric, a woven fabric, a paper or the like. The filter element is realized, in particular, as a micro-filter or fine-dust filter, preferably as a HEPA filter.

Furthermore, it is proposed that the first connection unit be arranged at a distance apart from the second connection unit along a direction of connection. Advantageously, the mechanical stability of the dust extraction device on the hand-held power tool can thereby be further improved. In this context, a direction of connection is to be understood to mean, in particular, the direction of connection of the dust extraction device in the process of connection to the hand-held power tool. The direction of connection may extend linearly, or about a pivot axis. The direction of connection may be substantially parallel to, cross or be substantially perpendicular to the work axis of the hand-held power tool. "At a distance apart" in this context is to be understood to mean, in particular, that arranged between the first connection unit and the second connection unit there is a region in which the first and the second connection unit do not overlap perpendicularly in relation to the direction of connection. The length of this region along the direction of connection is the distance between the first connection unit and the second connection unit along the direction of connection. The length of the region corresponds, in particular, to at least 20% of the length of the dust extraction device along the direction of connection, preferably at least 35% of the length of the dust extraction device, more preferably at least 50% of the length of the dust extraction device. Alternatively, it is also conceivable the first connection unit is assigned at a distance apart from the second connection unit along or parallel to a telescoping axis of a telescoping unit of the dust extraction device. Preferably, the telescoping axis is substantially parallel to the connection axis.

Furthermore, it is proposed that the first connection unit have at least one guide element, in particular at least two guide elements, the guide element being realized, in particular, as a guide rail. Advantageously, stable guiding of the dust extraction device during the connection process can thereby be achieved. The at least two guide elements are preferably parallel to each other. In particular, the guide elements constitute a single piece with the housing of the dust extraction device.

It is additionally proposed that the guide element have at least two differing form closure regions. It is thereby possible, advantageously, to ensure a greatest possible degree of compatibility with a variety of hand-held power tools that, in turn, have corresponding form closure elements. In particular, the differing form closure regions differ in their cross section and/or differ in their contour. The cross section may be, for example, angular, rectangular, rounded, swallowtail-shaped, etc.

Furthermore, it is proposed that the second connection unit have a locking unit that can be actuated manually. Advantageously, unwanted detachment of the dust extraction device from the hand-held power tool can thereby be prevented. Preferably, the locking unit is of a self-latching design. In particular, the locking unit is realized in such a manner that it latches-in automatically at the end of the connection process. Preferably, the locking unit has a locking element to which a force is applied, via a restoring element, in the direction of a locking position. The restoring element is realized, in particular, as a spring element. The spring element may be realized, for example, as an annular spring, as a helical spring, as a spiral spring, as a wrap spring, etc.

Furthermore, it is proposed that the second connection unit have an ancillary handle, the ancillary handle having a fixing element for fixing the ancillary handle to the hand-held power tool. The ancillary handle is realized, in particular, so as to be detachable from the hand-held power tool, in particular from the housing of the hand-held power tool.

It is additionally proposed that the restoring element act upon the fixing element of the ancillary handle via the locking element of the locking unit. Advantageously, effective fixing can thereby be realized. In particular, the restoring bears directly against the locking element, and the locking element bears directly against the fixing element.

Furthermore, it is proposed that, in the locked state, the ancillary handle be realized so as to be movable relative to the hand-held power tool. Advantageously, the position of the ancillary handle can thereby be optimally set by the user. In particular, in this case the ancillary handle is realized so as to be rotatable by at least 30°, preferably by at least 60°, more preferably by at least 150°, about a pivot axis. The pivot axis is preferably parallel to or substantially coaxial with the work axis of the hand-held power tool. Preferably, when the dust extraction device has been fastened, or fixed, to the hand-held power tool, no relative movement of the ancillary handle with respect to the housing of the hand-held power tool is possible.

Furthermore, it is proposed that the fastening device have a connection housing part, which is connected to at least one further housing part of the dust extraction device, in particular at least two further housing parts of the dust extraction device, via at least one first fastening element and via at least one second fastening element. In particular, the second connection unit and the second connection unit are arranged on the connection housing part. Preferably, the first connection unit and/or the second connection unit are realized so as to constitute, at least partly, in particular fully, a single piece with the connection housing part. The first fastening element and the second fastening element may be realized so as to be substantially identical.

It is additionally proposed that the at least one first fastening element be arranged in front of the first connection unit and the second connection unit in the direction of connection, and the at least one second fastening element be arranged after the first and the second connection unit in the direction of connection. Advantageously, particularly stable connection of the connection housing part can thereby be realized.

In particular, a distance between the first fastening element and the second fastening element corresponds to at least 65%, preferably at least 80%, of a length of the housing of the dust extraction device.

Furthermore, the disclosure relates to a dust extraction device for a hand-held power tool, having a fastening device as previously described.

Furthermore, the disclosure relates to a system composed of a first hand-held power tool, a second hand-held power tool and a dust extraction device, having a fastening device, which is designed to detachably connect the dust extraction device to the first and the second hand-held power tool, having a first connection unit for connecting the dust extraction device to the hand-held power tool by form closure, the first connection unit having at least one guide element that has at least two differing form-closure regions. It is proposed that one of the form-closure regions be designed for connection to the first hand-held power tool by form closure, and the other form-closure region is designed for connection to the second hand-held power tool by form closure. Advantageously, it is thereby possible to realize stable connection of the dust extraction device to hand-held power tools that have differing housings.

BRIEF DESCRIPTION OF THE DRAWINGS

Further advantages are evident from the following description of the drawings. The drawings, the description and the claims contain numerous features in combination.

Persons skilled in the art will expediently also consider the features individually and combine them to form appropriate, further combinations.

Figure 1:
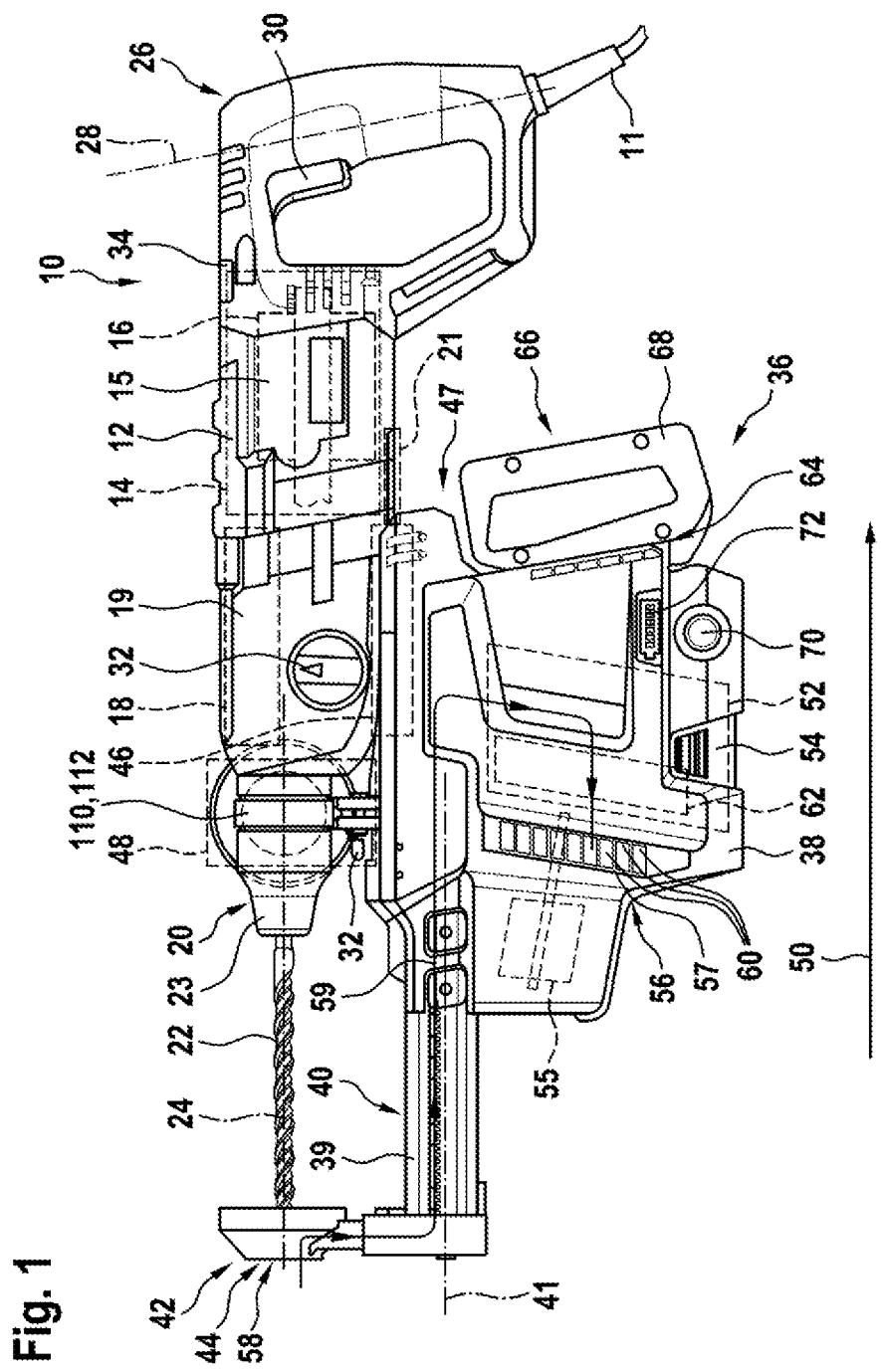
Figure 2A:
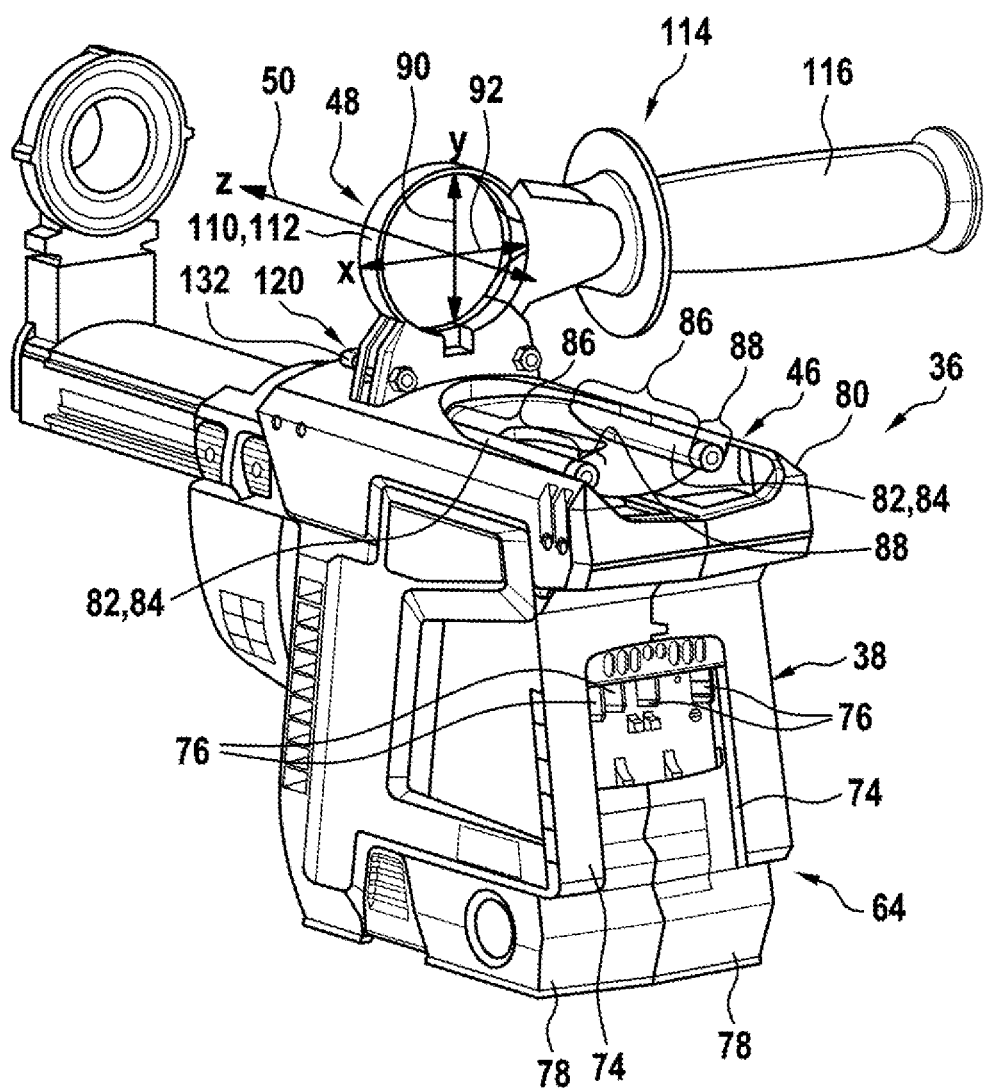
Figure 2B:
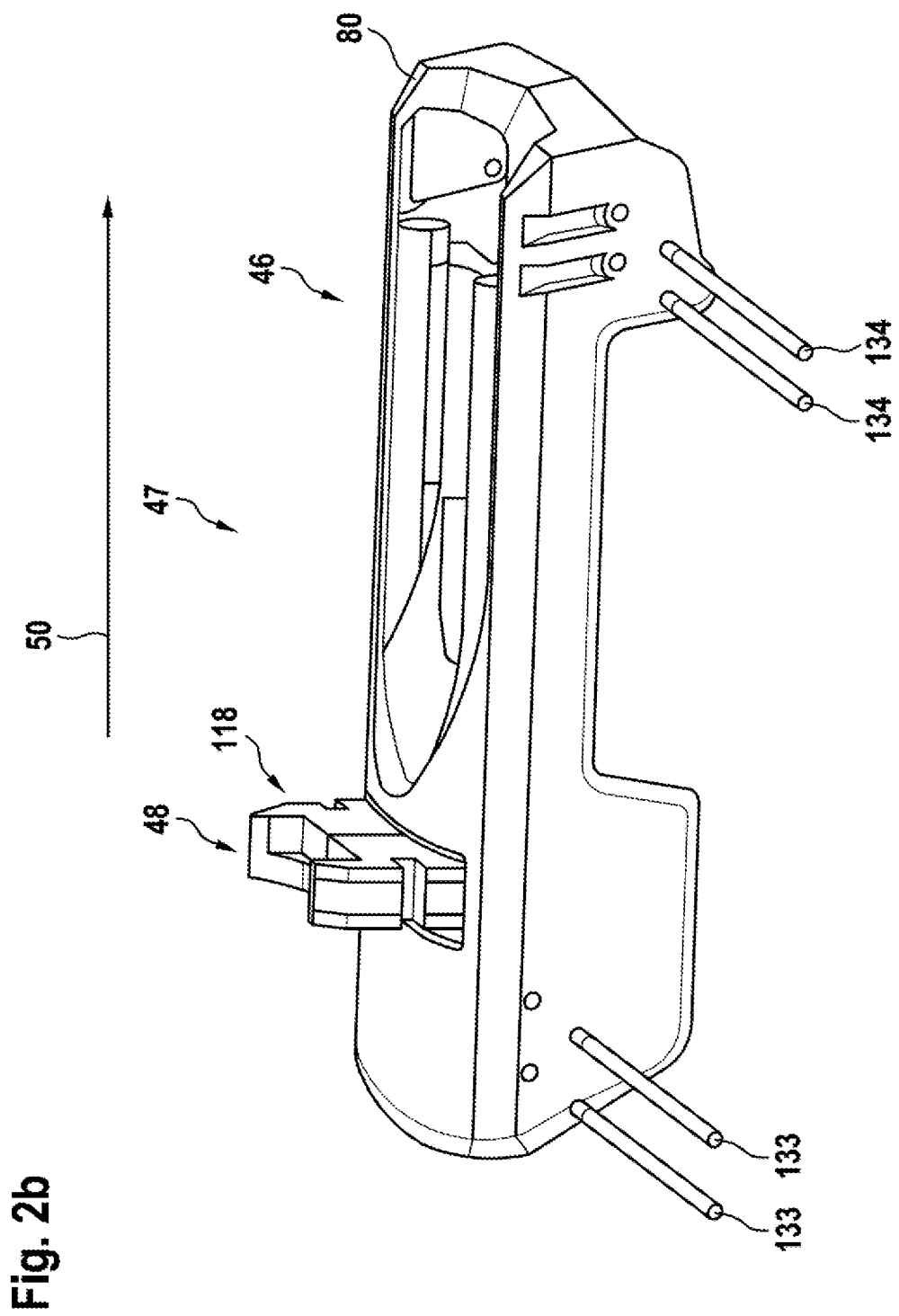
Figure 3A:
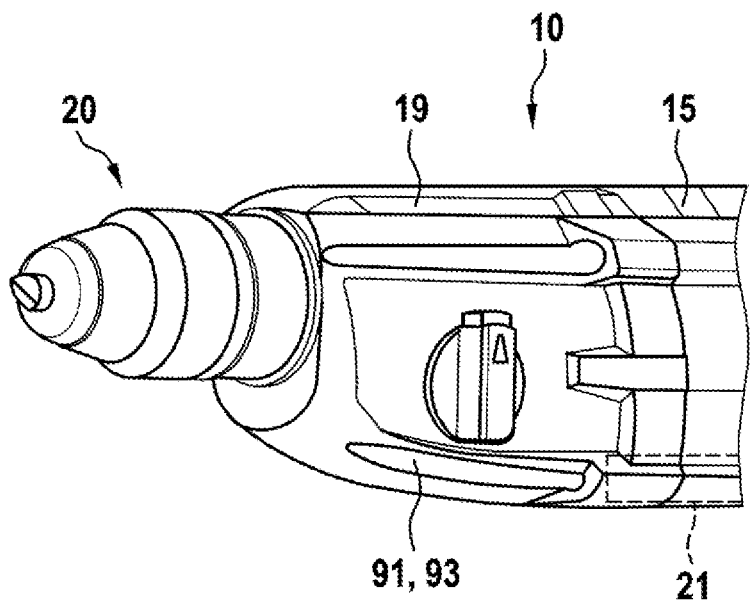
Figure 3B:
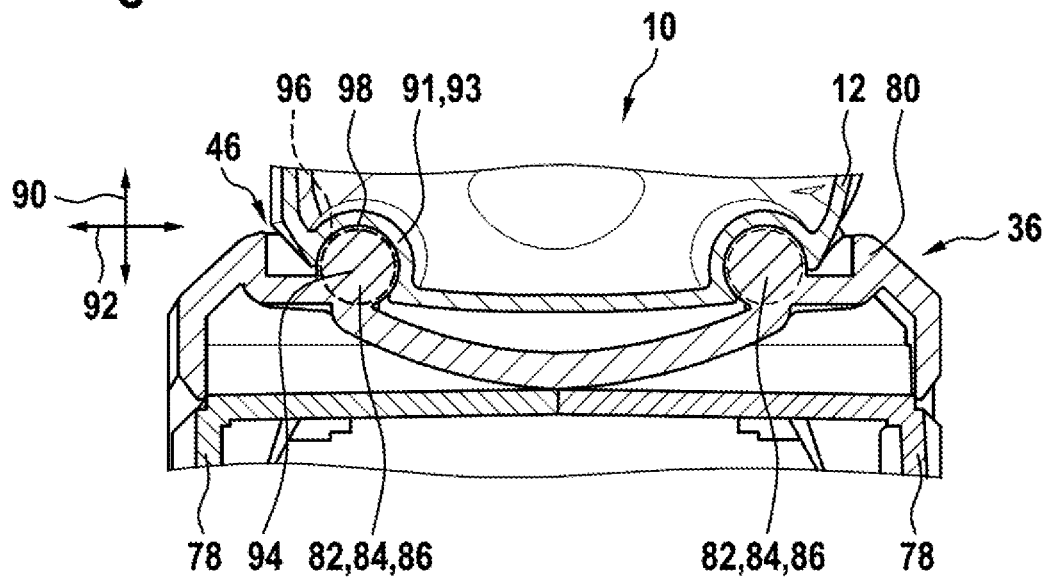
Figure 4A:
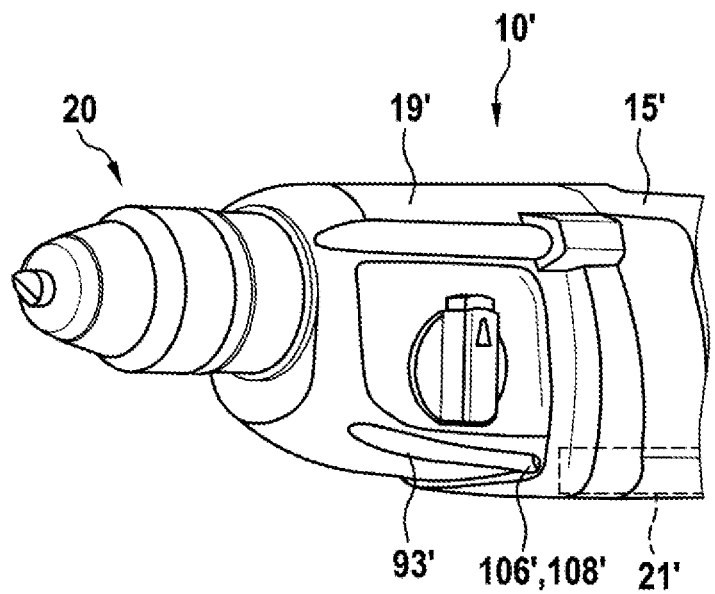
Figure 4B:
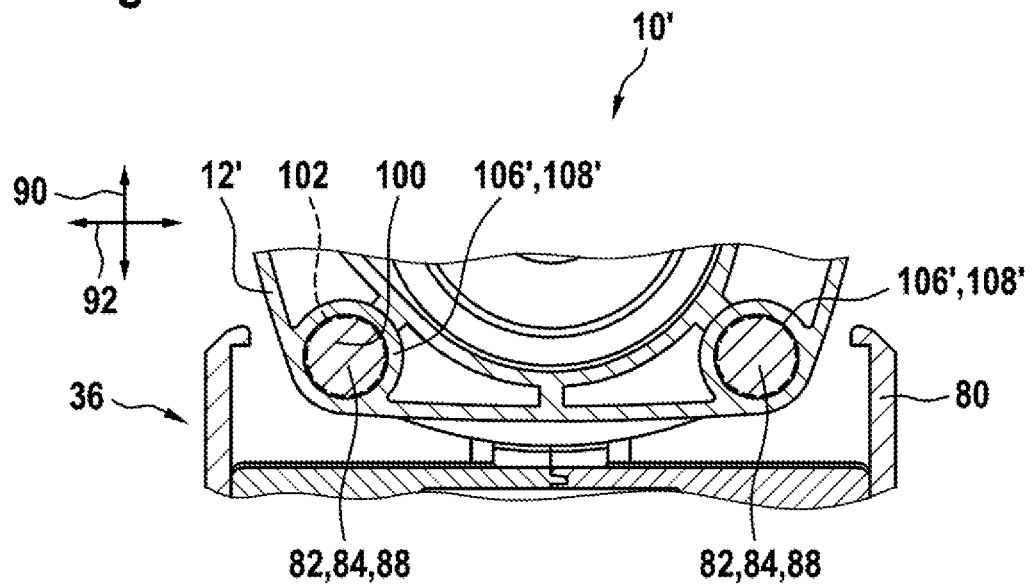
Figure 5A:
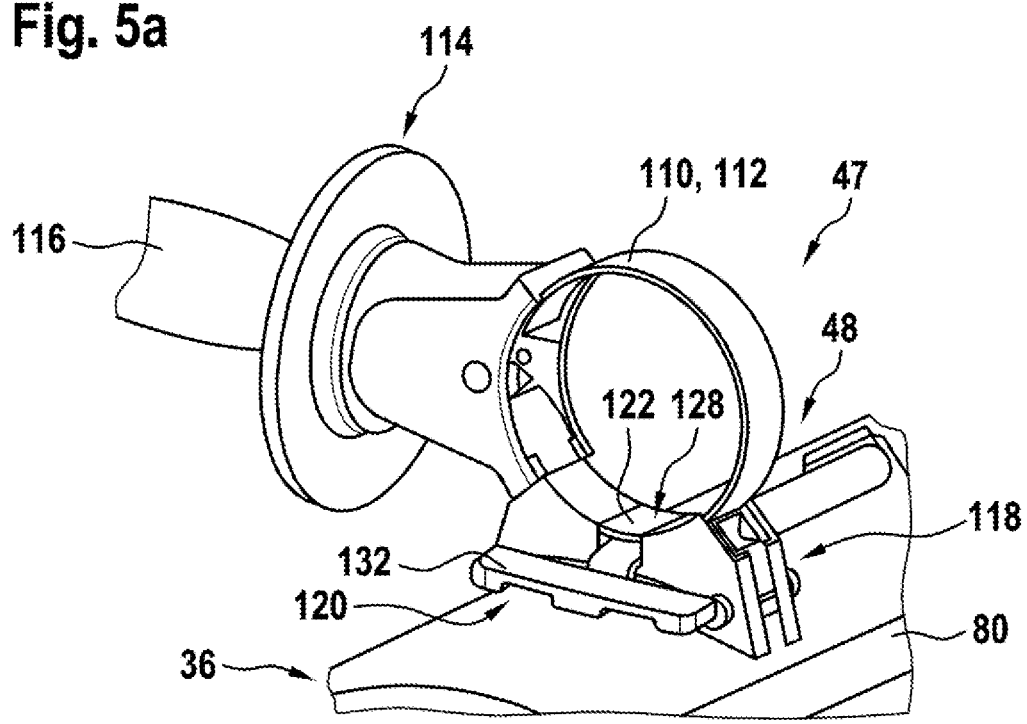
Figure 5B:
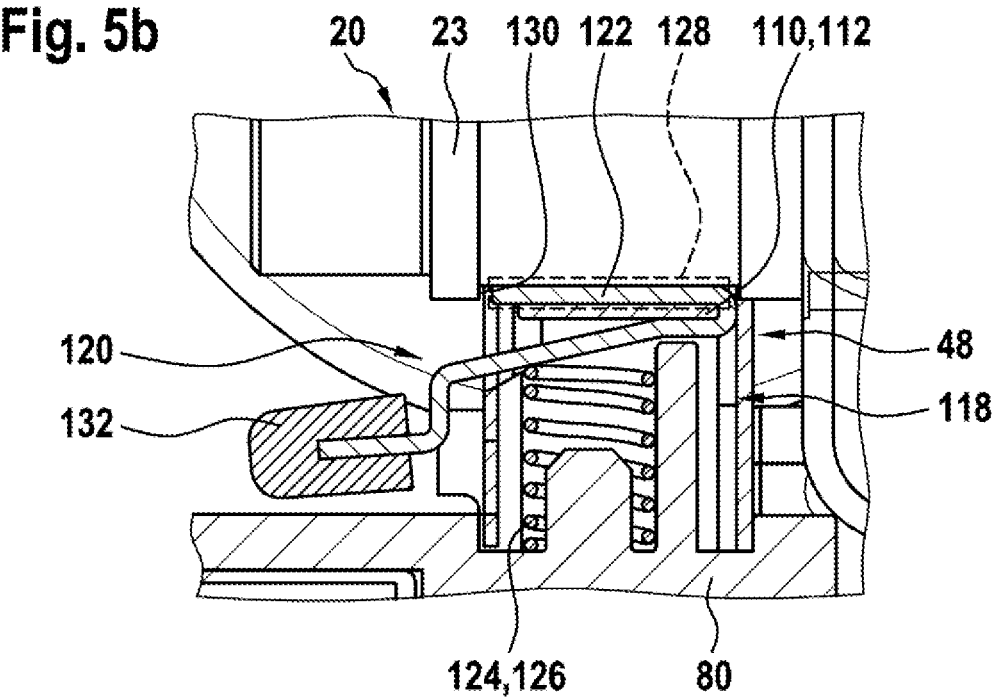

There are shown:

FIG. 1 a side view of the hand-held power tool and of a dust extraction device having a fastening device;

FIG. 2a a perspective rear view of the dust extraction device;

FIG. 2b a perspective view of a connection housing part of the dust extraction device;

FIG. 3a a perspective partial view of the first hand-held power tool according to FIG. 1;

FIG. 3b a cross section through the dust extraction device when having been connected to the first hand-held power tool;

FIG. 4a a perspective partial view of a second hand-held power tool;

FIG. 4b a cross section through the dust extraction device when having been connected to the second hand-held power tool;

FIG. 5a a perspective view of a second connection unit of the dust extraction device;

FIG. 5b a section through the second connection unit according to FIG. 5a.

DETAILED DESCRIPTION

FIG. 1 shows a side view of a hand-held power tool 10. The hand-held power tool 10 is realized, by way of example, as a hammer drill. The hand-held power tool 10 is realized, by way of example, as a mains-power hand-held power tool 10, and has a mains-power cable 11, via which the hand-held power tool 10 can be connected to an energy source, for example an electricity supply system. Alternatively, it would likewise be conceivable for the hand-held power tool 10 to be realized as a battery-operated hand-held power tool, and to have a hand-held power tool battery pack, or to be connectable to a hand-held power tool battery pack.

The hand-held power tool 10 has a housing 12, which is realized as an outer housing. Arranged in the housing 12 of the hand-held power tool 10 is a drive unit 14, which comprises an electric motor 16, and a transmission unit 18, which comprises a percussion mechanism that, by way of example, is realized as a pneumatic percussion mechanism. Arranged at a front end of the hand-held power tool 10 is a tool receiver 20, in which an insert tool 22 is detachably fastened. A rotational driving motion of the drive unit 14 can be converted, via the transmission unit 18, into a rotational and/or linearly oscillating driving motion of the tool receiver 20. The housing 12 of the hand-held power tool 10 has a transmission housing part 19, which encloses, in particular substantially fully encloses, the transmission unit 18, and a motor housing part 15, which encloses, in particular substantially fully encloses, the drive unit 14.

The transmission housing part 19 and the motor housing part 15 are connected to each other via a screwed connection. For this purpose, the housing 12 of the hand-held power tool 10 has screw bosses 21, which extend substantially parallel to a work axis 24 of the hand-held power tool 10.

The insert tool 22 is realized, by way of example, as a masonry drill. The insert tool 22 is realized such that it can be driven in a rotary and/or linearly oscillating manner along the work axis 24. Arranged at the rear end of the hand-held power tool 10 is a handle 26, which extends along a grip axis 28. The grip axis 28 is substantially perpendicular to the work axis 24. The handle 26 is arranged, by way of example, in such a manner that it is intersected by the work axis 24.

In particular, the handle 26 is realized substantially as a D shape. Arranged on the handle 26 is an operating switch 30, which can be actuated manually and via which the hand-held power tool 10 can be switched on and off. In addition, arranged on the side of the housing 12, there is a mode selector switch 32. The mode selector switch 32 is designed for selecting the operating mode, in this case between a drilling mode, a hammer drilling mode and a chipping mode. In addition, arranged on the top side of the hand-held power tool 10, there is rotation-direction selector switch 34, for selecting a direction of rotation of the insert tool 22.

Furthermore, FIG. 1 shows a side view of a dust extraction device 36. The dust extraction device 36 has a housing 38, which is realized as an outer housing. The dust extraction device 36 has a telescoping unit 40, which comprises a telescoping tube 39 and which is mounted in a linearly movable manner in the housing 38 of the dust extraction device 36. The movement of the telescoping unit 40 is effected along a telescoping axis 41, which, by way of example, is substantially parallel to the work axis 24 of the hand-held power tool 10.

Arranged at the front end of the telescoping unit 40 that faces away from the housing 38 of the dust extraction device 36 there is a suction head 42. The suction head 41 is realized so as to be movable, via the telescoping unit 40, relative to the housing 38 of the dust extraction device 36. The suction head 42 has an insert-tool lead-through 44. The insert-head lead-through 44 is realized, by way of example, as a hollow cylinder, and extends substantially coaxially with the work axis 24 of the hand-held power tool 10. When the system, composed of a hand-held power tool 10 and dust extraction device 36, is in operation, the insert tool 22 passes through the insert-tool lead-through 44. In FIG. 1, the telescoping unit 40 is shown in an extended state. In operation, in which force is applied to the telescoping unit as a result of the suction head 42 bearing against a workpiece, the telescoping unit 40 is retracted in dependence on the depth of penetration of the insert tool 22.

The dust extraction device 36 has a fastening device 47, via which the dust extraction device 36 is detachably connected to the hand-held power tool 10. For the purpose of connecting the dust extraction device 36 to the hand-held power tool 10, it is slid onto the hand-held power tool 10 along a direction of connection 50. The direction of connection 50, by way of example, is rectilinear and parallel to the telescoping axis 41 and the work axis 24.

The dust extraction device 36 has a dust collection chamber 52, which is detachably connected to the housing 38 of the dust extraction device 36. The dust collection chamber 52 has a dust collection chamber housing 54. The dust collection chamber 52 is arranged on a side of the dust extraction device 36 that faces away from the connection units 46, 48.

An airflow, which is designed to extract by suction dust material at a work point of the insert tool 22, is generated during operation by means of a fan unit 56. The fan unit 56 is arranged, by way of example, in the housing 38 of the dust extraction device 36. Alternatively, it would likewise be conceivable for the fan unit 56 to be arranged in the housing 12 of the hand-held power tool 10.

The fan unit 56 has a ventilator 57, which is realized, by way of example, as a radial ventilator and which is designed to generate the airflow in the dust extraction device 36. The ventilator 57 is connected in a rotationally fixed manner to a motor shaft of an electric motor 55, and is driven by this motor shaft.

In the dust extraction device 36, the airflow is routed through an air channel 59, which has an extraction opening 58, via which the airflow enters the air channel 59, and a plurality of outlet openings 60, via which the airflow exits the dust extraction device 36. The extraction opening 58 is arranged in the region of the suction head 42, in particular in the region of the insert-tool lead-through 44. The airflow is thus taken in via the extraction opening 58 in the region of the suction head 42 and, via the air channel 59, is routed through the telescoping tube 39 of the telescoping unit 40 into the dust collection chamber 52. Arranged in the dust collection chamber 52 is a filter unit 62, which is designed to filter the dust material out of the airflow. The airflow exits the dust collection chamber 52 via the filter unit 62 and is routed to the outlet openings 60.

For the purpose of supplying energy to the dust extraction device 36, in particular to the fan unit 56 of the dust extraction device 36, it comprises a battery interface 64, which is designed to detachably connect the dust extraction device 36 to a hand-held power tool battery pack 66. The hand-held power tool battery pack 66 has a battery-pack housing 68, in which at least one battery cell (not represented) is arranged, by way of example ten battery cells, in two layers. The hand-held power tool battery pack 66 is slid from below, or substantially perpendicularly in relation to the direction of connection 50, onto the dust extraction device 36. The hand-held power tool battery pack 66 is realized, by way of example, as an 18 V battery pack.

For the purpose of putting the dust extraction device 36 into operation, there is an On/Off switch 70 arranged on the housing 38. The On/Off switch 70 is realized, by way of example, as a pushbutton. The On/Off switch 70 is arranged on the side of the housing 38 of the dust extraction device 36. Alternatively, it would also be conceivable that the dust extraction device 36 is connected to the hand-held power tool 10 via a communication interface (not represented), and that the dust extraction device 36 can be switched on and off via the hand-held power tool 10, in particular via the operating switch 30 of the hand-held power tool 10. The communication interface may be realized, for example, by means of electrical contact elements or by means of a wireless communication unit such as, for example, a Bluetooth interface.

Arranged adjacently to the On/Off switch 70, in particular above the On/Off switch 70, is a charge-state indicator 72. The charge-state indicator 72 is designed to indicate the charge state of the hand-held power tool battery pack 66 connected to the dust extraction device 36.

FIG. 2a shows a perspective view of the dust extraction device 36. In this illustration, the dust extraction device 36 is represented without the hand-held power tool battery pack 66. The battery interface 64 comprises two guide rails 74, which are designed to guide the hand-held power tool battery pack 66 during connection to the dust extraction device 36. Furthermore, the battery interface 64 comprises electrical contact elements 76 for electrically connecting the dust extraction device 36 to the hand-held power tool battery pack 66.

The housing 38 of the dust extraction device 36 comprises two housing parts 78, which are realized as housing half-shell parts, and a connection housing part 80. The connection housing part 80 is formed, by way of example, from a plastic. The first connection unit 46 and the second connection unit 48 are arranged on the connection housing part 80.

FIG. 2b shows the connection housing part 80 in a perspective view. The connection housing part is connected to the two housing parts 78 via two first fastening elements 133 and two second fastening elements 134. The first and the second fastening elements 133, 134 are realized as rod-type pins, which connect the housing parts 78, 80 to each other by force closure and form closure. In this case, respectively one of the fastening elements 133, 134 is received, or received in a force-closed and form-closed manner, by a receiver in the connection housing part 80, and in respectively one receiver of the two housing parts 78. The fastening elements 133, 134 are inserted, parallel to each other and substantially perpendicularly in relation to the direction of connection 50, into the housing 38.

In order to realize a particularly stable connection, the first and the second fastening elements 133, 134 are arranged at different ends of the connection housing part 80. In particular, the first fastening elements 133 are arranged in front of the second connection unit 48 in the direction of connection 50, and the second fastening elements 134 are arranged after the first connection unit 46 in the direction of connection.

In particular, the first connection unit 46 is realized so as to constitute a single piece with the connection housing part 80. The first connection unit 46 is designed to connect the dust extraction device 36 to the hand-held power tool 10 by form closure. In addition, the first connection unit 46 is designed to guide the dust extraction device 36 in the process of connection to the hand-held power tool 10, as in FIG. 2a. The form-closure connection in this case acts along a first form-closure axis 90 and a second form-closure axis 92, which are perpendicular to each other and perpendicular to the direction of connection 50. The first connection unit 46 has two guide elements 82, which are realized as guide rails 84. The guide elements 82 extend substantially rectilinearly along the direction of connection 50 of the dust extraction device 36.

The first connection unit 46 has, in particular the guide elements 82 of the first connection unit 46 have, two differing form-closure regions 86, 88. The two differing form-closure region 86, 88 are arranged in succession along the direction of connection 50. The first form-closure region 86 is arranged in front of the second form-closure region 88 in the direction of connection 50.

The first and the second form-closure regions 86, 88 are preferably realized, at least partly, for connection by form closure to differing hand-held power tools 10, 10' (see FIG. 3a and FIG. 4a).

FIG. 3a shows the first hand-held power tool 10 from the front, in a perspective partial view. Likewise, FIG. 4a shows the second hand-held power tool 10' in a perspective partial view. The first hand-held power tool 10 corresponds to the hand-held power tool 10 according to FIG. 1, and the second hand-held power tool 10' is likewise realized as a hammer drill, and differs from the first hand-held power tool 10, in particular, in the transmission unit, which is accommodated in the transmission housing part 19' and requires a lesser axial structural space. The transmission housing part 19' of the second hand-held power tool 10' is therefore also shorter than the transmission housing part 19 of the first hand-held power tool 10.

The form-closure connection of the first connection unit 46 to the first hand-held power tool 10 is effected via the first form-closure region 86 and the second form-closure region 88 of the guide element 82 and a corresponding form-closure element 91 on the transmission housing part 19 of the hand-held power tool 10. The corresponding form-closure element 91 is realized, by way of example, as a longitudinal slot 93, which extends substantially parallel to the work axis 24 of the hand-held power tool 10. In particular, the longitudinal slot 93 is located in front of a screw boss 21, and extends coaxially therewith. The form-closure element 91 is arranged on the underside of the hand-held power tool 10.

FIG. 3*b* shows a cross section through the dust extraction device 36 and the hand-held power tool 10 in the region of the first connection unit 46. In the first form-closure region 86, the guide element 82 has a substantially circular cross section 94, having a circular outer contour line 96, the contour line 96 extending in the form of a circle by approximately 270° around the cross section 94. The form-closure element 91 of the hand-held power tool 10 that is realized as a longitudinal slot 93 has an inner profile 98 that extends in the form of a circle by approximately 250° around the guide element 82. The form-closure element 91 thus engages behind the guide element 82 in such a manner that a form closure is formed in the two mutually perpendicular form-closure axes 90, 92.

The second form-closure region 88 has a circular cross section 100, the contour line 102 of the second form-closure region extending fully by 360° around the guide element 82 in the second form-closure region 88. The diameter of the cross section 100 of the second form-closure region 88 corresponds substantially to the diameter of the cross section 94 of the first form-closure region 86. Thus, the second form-closure region 88 can also form a form-closure connection to the form-closure element 91 of the hand-held power tool 10.

The form-closure connection of the first connection unit 46 to the second hand-held power tool 10' is effected only by means of the second form-closure region 88 of the guide element 82 and a corresponding form-closure element 106' of the second hand-held power tool 10'. The corresponding form-closure element 106' is realized, exemplarily, as a hollow cylindrical receiver 108', which is located in front of the screw boss 21' of the second hand-held power tool 10'.

FIG. 4*b* shows a cross section through the dust extraction device 36 and the second hand-held power tool 10' in the region of the second form-closure region 88 of the first connection unit 46. The guide element 82 is fully encompassed by the form-closure element 106', realized as a hollow cylindrical receiver 108', of the second hand-held power tool 10', and thereby forms a form closure in the two mutually perpendicular form-closure axes 90, 92.

The transmission housing part 19' of the second hand-held power tool 10' likewise comprises a longitudinal slot 93' located in front of the screw boss 21'. Its inner profile, however, extends by less than 180° around the guide element 82, such that no form closure is produced.

FIG. 5*a* shows a perspective view of the second connection unit 48 of the fastening device 47. The second connection unit 48 is designed to connect the dust extraction device 36 to the hand-held power tool 10 by force closure. The second connection unit 48 has a fixing element 110. The fixing element 110 is realized, in particular, in such a manner that, in the fastened state, it exerts a force upon the housing 12 of the hand-held power tool 10. The fixing element 110 is realized, in particular, as a tensioning band 112, which is shaped from a metallic plate. The fixing element 110 is assigned, in particular, to an ancillary handle 114. The ancillary handle 114 has a grip region 116 at which, in addition to the handle 26 of the hand-held power tool 10, a user can grip the hand-held power tool 10. The grip region 116 is realized so as to be rotatable relative to the fixing element 110. The grip region 116 is connected to the fixing element 110 in such a manner that the tensioning band 112 is tensioned or de-tensioned by a rotation of the grip region 116. When the fixing element 110 is in the de-tensioned state, the dust extraction device 36 can be slid onto the hand-held power tool 10, along the direction of connection 50. When the fixing element 110 is in the tensioned state, the dust extraction device 36 cannot be slid onto the hand-held power tool 10. At the end of the slide-on movement, the fixing element 110 encompasses the housing 12 of the hand-held power tool 10, in particular in the region of the tool receiver 20 or, by way of example, at the drill chuck 23. The fixing element 110 can be tensioned by a rotation of the grip region 116, such that a force closure is effected between the dust extraction device 36 and the hand-held power tool 10 in order, advantageously, to connect the dust extraction device 36, substantially without play, to the hand-held power tool 10.

By means of the fixing element 110 realized as a tensioning band 112, the ancillary handle 114 is connected, preferably fixedly, to the housing 38 of the dust extraction device 36, in particular to the connection housing part 80. The ancillary handle 114 is preferably not connected to the dust extraction device 36 such that it is detachable without use of any tools. The housing 38 of the dust extraction device 36 has a bearing unit 118, in which the ancillary handle 114, in particular the fixing element 110 of the ancillary handle 114, is rotatably mounted. The ancillary handle 114 is mounted, by way of example, so as to render possible a rotational movement of the ancillary handle 114 by approximately 180° about the work axis 24 of the hand-held power tool 10. As a result, advantageously, the ancillary handle 114 can be arranged on both sides of the dust extraction device 36.

The second connection unit 48 additionally has a locking unit 120. The locking unit 120 is designed, in particular, to lock the dust extraction device 36 to the hand-held power tool 10, irrespective of whether the fixing element 110 is in a tensioned or de-tensioned state.

FIG. 5*b* shows a section through the second connection unit 48 in the locked state. The locking unit 120 comprises a locking element 122, which is movably mounted in the bearing unit 118. In particular, arranged in the bearing unit 118 is a restoring element 124, which is realized, by way of example, as a compression spring. The restoring element 124 bears against the locking element 122. In particular, the restoring element 124 applies a force to the locking element 122 in the direction of the fixing element 110. The locking element 122 encompasses the fixing element 110, at least partly, in such a manner that it bears against two opposite sides of the fixing element 110. In particular, the locking element 122 encompasses the fixing element 110 in such a manner that, in the region of the locking element 122, the fixing element 110 does not bear directly against the hand-held power tool 10, but bears against the hand-held power tool 10 via the locking element 122.

The locking element 122 has a locking region 128 that, in the fastened state, bears directly against the hand-held power tool 10. In the locked state, the locking element 122, in particular the locking region 128, is arranged in such a manner that a movement of the dust extraction device 36 contrary to the direction of connection 50 is prevented by a stop element 130 of the hand-held power tool 10. The stop element 130 is arranged in the region of the tool receiver 20. If the fixing element 110 is in a de-tensioned state, withdrawal of the dust extraction device 36 from the hand-held power tool 10 is prevented by the locking region 128 impinging on the stop element 130.

For the purpose of unlocking the locking unit 120, the locking element 122 is coupled to an actuation region 132 in such a manner that, upon an actuation of the actuation region 132, the locking element 122 can be moved out of the locking position, contrary to the force of the restoring element 124. The actuation region 132 is arranged, by way of example, in front of the bearing unit 118 in the direction of connection 50. In particular, by means of the actuation of the actuation region 132, both the locking region 128 and the fixing element 110 are displaced in the direction of the dust extraction device 36 in such a manner that, upon a movement of the dust extraction device 36 contrary to the direction of connection 50, the locking region 128 does not impinge on the stop element 130.

Advantageously, owing to the mechanism described above, the ancillary handle 114 is designed so as to be rotatable in the locked state if the fixing element 110 is in the de-tensioned state. The position of the ancillary handle 114 can thus be adjusted without separating the dust extraction device 36 from the hand-held power tool 10.

What is claimed is:

1. A fastening device for detachably connecting a dust extraction device to a hand-held power tool, comprising:
   a first connection unit configured to connect the fastening device to the hand-held power tool by form closure; and
   a second connection unit configured to connect the fastening device to the hand-held power tool by force closure, wherein:
   the fastening device is connected to a housing of the dust extraction device,
   the second connection unit has a locking unit configured to be actuated manually,
   the locking unit has a locking element to which a force is applied, via a restoring element, in a direction toward a locking position at which the dust extraction device is locked to the hand-held power tool,
   the second connection unit has an ancillary handle, which has a fixing element configured to fix the ancillary handle to the hand-held power tool so as to produce the force closure, and
   the restoring element acts upon the fixing element via the locking element of the locking unit.

2. The fastening device according to claim 1, wherein the first connection unit is arranged at a distance apart from the second connection unit along a direction of connection along which the fastening device is configured to be connected to the hand-held power tool.

3. The fastening device according to claim 1, wherein the first connection unit has at least one guide element configured as a guide rail.

4. The fastening device according to claim 3, wherein the guide element has at least two differing form closure regions.

5. The fastening device according to claim 1, wherein the locking unit has a self-latching configuration.

6. The fastening device according to claim 1, wherein, in the locking position of the locking element, at which the dust extraction device is locked to the hand-held power tool, the ancillary handle is rotatably movable relative to the hand-held power tool.

7. The fastening device according to claim 1, further comprising a connection housing part connected to at least one housing part of the housing of the dust extraction device via at least one first fastening element and via at least one second fastening element.

8. The fastening device according to claim 7, wherein the first and second connection units are arranged between the at least one first fastening element and the at least one second fastening element along a direction of connection along which the fastening device is configured to be connected to the hand-held power tool.

9. The fastening device according to claim 7, wherein the at least one housing part of the housing includes at least two housing parts to which the first and second fastening elements connect the connection housing part.

10. The fastening device according to claim 1, wherein the hand-held power tool is configured as a hammer drill.

11. The fastening device according to claim 1, wherein the first connection unit has at least two guide elements, at least one of the guide units configured as a guide rail.

12. A dust extraction device for a hand-held power tool, comprising:
    a housing; and
    a fastening device connected to the housing and configured to detachably connect the dust extraction device to the hand-held power tool, the fastening device including:
    a first connection unit configured to connect the fastening device to the hand-held power tool by form closure, and
    a second connection unit configured to connect the fastening device to the hand-held power tool by force closure, wherein:
    the second connection unit has a locking unit configured to be actuated manually,
    the locking unit has a locking element to which a force is applied, via a restoring element, in a direction toward a locking position at which the dust extraction device is locked to the hand-held power tool,
    the second connection unit has an ancillary handle, which has a fixing element configured to fix the ancillary handle to the hand-held power tool so as to produce the force closure, and
    the restoring element acts upon the fixing element via the locking element of the locking unit.

13. The dust extraction device according to claim 12, further comprising a dust chamber arranged in the housing and a fan unit configured to generate an airflow.

14. A system, comprising:
    a first hand-held power tool;
    a second hand-held power tool; and
    a dust extraction device having a fastening device configured to detachably connect the dust extraction device to the first and second hand-held power tools, the fastening device having a first connection unit with at least one guide element, the guide element having at least a first form-closure region and a second form-closure regions that differs from the first form-closure region, wherein:
    the first form-closure region is configured to connect the fastening device to the first hand-held power tool by form closure, and wherein the second form-closure region is configured to connect the fastening device to the second hand-held power tool by form closure, wherein:
    the fastening device includes a first connection unit configured to connect the fastening device to one of the first and second hand-held power tools by form closure, and a second connection unit configured to connect the fastening device to the one of the first and second hand-held power tools by force closure, the second connection unit including an ancillary handle having a fixing element configured to fix the ancillary handle to the one of the first and second hand-held power tools and produce the force closure, the fastening device is connected to a housing of the dust extraction device, the second connection unit has a locking unit configured to be actuated manually, the locking unit has a locking element to which a force is applied, via a restoring element, in a direction toward a locking position at which the dust extraction device is locked to the one of the first and second hand-held power tools, and the restoring element acts upon the fixing element via the locking element of the locking unit.

\* \* \* \* \*